United States Patent
Londot et al.

[19]

[11] Patent Number: 6,055,470

[45] Date of Patent: Apr. 25, 2000

[54] HOT SHUTDOWN MONITOR FOR INTERNAL COMBUSTION ENGINES

[75] Inventors: Ronnie D. Londot, Brownstown; David A. Venable, Greenwood; Dmitri Baraban, Marion, all of Ind.

[73] Assignee: Cummine Engine Company, Inc., Columbus, Ind.

[21] Appl. No.: 09/087,252

[22] Filed: May 29, 1998

[51] Int. Cl.[7] .......................... G01M 15/00; G01F 13/00; G06F 15/00
[52] U.S. Cl. ................................. 701/35; 73/116
[58] Field of Search .................................... 701/112, 107, 701/101, 102, 26, 35, 34, 31; 73/116, 117.2, 117.3, 118.1

[56] References Cited

U.S. PATENT DOCUMENTS

| | | | |
|---|---|---|---|
| 3,680,539 | 8/1972 | Savage et al. | 123/198 |
| 4,088,110 | 5/1978 | Sperline | 123/198 |
| 4,120,278 | 10/1978 | Ward | 123/198 |
| 4,212,064 | 7/1980 | Forsythe et al. | 701/35 |
| 4,271,402 | 6/1981 | Kastura et al. | 340/52 |
| 4,648,364 | 3/1987 | Wills | 123/198 |
| 4,656,973 | 4/1987 | Endres | 123/41.15 |
| 4,926,331 | 5/1990 | Windle et al. | 701/35 |
| 4,939,652 | 7/1990 | Steiner | 701/35 |
| 5,062,399 | 11/1991 | Nagakura et al. | 123/198 |
| 5,305,216 | 4/1994 | Okura et al. | 364/424.01 |
| 5,600,558 | 2/1997 | Mearek et al. | 364/424.04 |

*Primary Examiner*—George Dombroske
*Attorney, Agent, or Firm*—Woodard, Emhardt, Naughton, Moriarty & McNett Patent and Trademark Attorneys

[57] ABSTRACT

The present invention relates to a hot shutdown monitor for an internal combustion engine, in which the engine control module (ECM) obtains engine operating information from various sensors and calculates an instantaneous load factor of the engine based upon various factors such as engine speed, engine fueling, exhaust manifold temperature, oil temperature, etc. This instantaneous load factor is preferably heavily filtered with the output of the filter determining a cumulative weighted load factor that represents a condition of the engine (i.e. the heating and cooling of the engine components). The present invention monitors for a shutdown request both from the operator (i.e. ignition keyoff or from other ECM control algorithms (i.e. engine protection). When an engine shutdown is detected, the weighted load factor is compared to a predetermined threshold. If the threshold is exceeded, a fault indicator is set within the ECM and the current engine data is captured for later retrieval. The filter constant and weighted load factor shutdown threshold may be predetermined based upon the particular engine performance requirements. Other embodiments of the present invention are also disclosed.

21 Claims, 3 Drawing Sheets

HOT SHUTDOWN MONITOR FOR INTERNAL COMBUSTION ENGINES

TECHNICAL FIELD OF THE INVENTION

The present invention generally relates to control systems for internal combustion engines and, more particularly, to a hot shutdown monitor for an internal combustion engine.

BACKGROUND OF THE INVENTION

By the very nature of their operation, internal combustion engines produce relatively high temperatures as a result of the combustion of an air/fuel mixture within the engine. These temperatures are normally kept at a manageable level by an engine cooling system which transfers a portion of this heat of combustion to the surrounding environment in order to cool the engine. Typically, this cooling system is in the form of a continuously circulating fluid coolant which is passed through a heat exchanging radiator in order to remove a portion of the heat from the engine. Such cooling systems normally cease to operate upon engine shutdown.

In many engines, particularly in turbocharged engines, critical stress can be placed upon certain engine components, such as the turbocharger and exhaust manifold, when the engine is operated under a heavy load and then shutdown without an adequate cooling off period. Operation of the engine at high load results in more air/fuel mixture being burned within the engine, thereby generating more heat to be dissipated. The engine therefore elevates in temperature, particularly the exhaust manifold which is used to evacuate the hot combustion exhaust gases, and the turbocharger, which is driven by all or a portion of the these exhaust gases.

At elevated temperatures produced by heavy load conditions in the engine, discontinuation of cooling at engine shutdown will allow the exhaust manifold and turbocharger to continue to increase in temperature for a time prior to cooling off to ambient temperature conditions. This is particularly troublesome for the turbocharger bearings, which will spin at vary high rpms (up to 100,000 rpm) for several minutes after the engine has shutdown with no cooling being applied thereto. Such hot engine shutdowns therefore greatly shorten the life of these components and comprise a major maintenance concern for such engines.

This problem is further compounded by the fact that most trucks having heavy duty turbocharged diesel engines are not driven by the owners of the trucks. There is therefore often not any economic incentive for the driver to follow the proper procedure for cooling off an engine prior to engine shutdown after heavy load operating conditions There is therefore a need for a method for determining if an engine is being shutdown prematurely during high temperature conditions, such that corrective actions may be taken in the future. There is also a need for a method for determining if prior hot engine shutdowns are likely responsible for current engine malfunctions. The present invention is directed toward meeting these needs.

SUMMARY OF THE INVENTION

The present invention relates to a hot shutdown monitor for an internal combustion engine, in which the engine control module (ECM) obtains engine operating information from various sensors and calculates an instantaneous load factor of the engine based upon various factors such as engine speed, engine fueling, exhaust manifold temperature, oil temperature, etc. This instantaneous load factor is preferably heavily filtered with the output of the filter determining a cumulative weighted load factor that represents a condition of the engine (i.e. the heating and cooling of the engine components). The present invention monitors for a shutdown request both from the operator (i.e. ignition keyoff) or from other ECM control algorithms (i.e. engine protection). When an engine shutdown is detected, the weighted load factor is compared to a predetermined threshold. If the threshold is exceeded, a fault indicator is set within the ECM and the current engine data is captured for later retrieval. The filter constant and weighted load factor shutdown threshold may be predetermined based upon the particular engine performance requirements. Other embodiments of the present invention are also disclosed.

In one form of the invention, a method for monitoring and recording hot shutdowns of an internal combustion engine is disclosed, comprising the steps of: a) determining a load factor of the engine; b) determining if said load factor exceeds a predetermined threshold; and c) recording a hot shutdown error if said load factor exceeds the predetermined threshold.

In another form of the invention, a method for monitoring and recording hot shutdowns of an internal combustion engine is disclosed, comprising the steps of: a) determining a load factor of the engine at successive instants of time; b) recording each said load factor; c) determining if the engine has been commanded to shut down; d) if the engine has been commanded to shut down, determining a respective time delay since each said recorded load factor; e) for each said recorded load factor, retrieving a predetermined time period threshold value chosen particularly for each value of recorded load factor; f) determining if each said time delay is greater than each said respective predetermined time period threshold; and g) recording a hot shutdown error if any said time delay is not greater than said respective predetermined time period threshold.

In another form of the invention, a method for monitoring and recording hot shutdowns of an internal combustion engine is disclosed, comprising the steps of: a) determining an instantaneous load factor of the engine at successive instants of time; b) determining a weighted load factor based upon a plurality of said instantaneous load factors; c) determining if said weighted load factor exceeds a predetermined threshold; d) determining if an operator of the engine has commanded a shutdown of the engine; e) recording a hot shutdown keyoff error if said weighted load factor exceeded said predetermined threshold and the operator commanded a shutdown of the engine; f) determining if an engine control module has commanded a shutdown of the engine; and g) recording a hot shutdown feature error if said weighted load factor exceeded said predetermined threshold and the engine control module commanded a shutdown of the engine.

DESCRIPTION OF THE PREFERRED EMBODIMENTS

Figure 1:
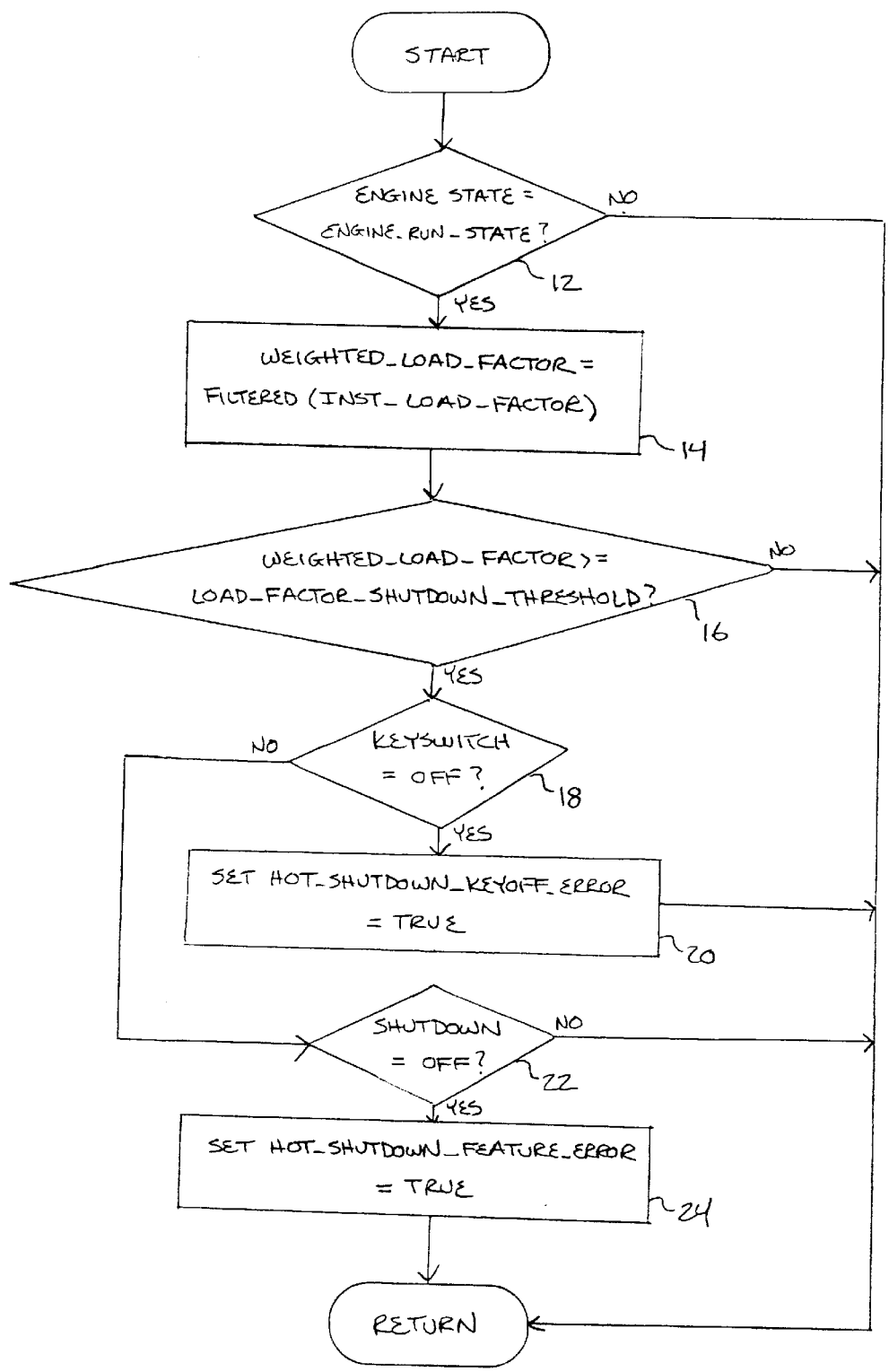
FIG. 1 is a schematic process diagram of a first embodiment engine hot shutdown monitor of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Because many vehicle owners may have concerns about an engine control module (ECM) allowing the vehicle engine to continue to run after the operator has requested a shutdown or has left the vehicle, the present invention is limited to logging the occurrence of a hot shutdown fault and of data reflective of the current engine operating conditions at the time of the shutdown. This capability will allow the vehicle operator/owner to be informed an improper shutdown has occurred, as well as allowing the vehicle manufacturer to track this data for warranty purposes or so that service personnel may discuss with the vehicle owner when turbocharger and/or exhaust manifold damage is occurring due to repeated or frequent hot shutdowns of the engine. This will result in the following benefits to the vehicle owner: improved engine availability, improved awareness of the need to allow the engine to cool down prior to shutdown, reduced repair cost due to engine damage, and provision of a history of hot engine shutdowns in order to assist the service organization in diagnosing engine issues.

Referring now to FIG. 1, there is illustrated a schematic process diagram of a first embodiment of the present invention, indicated generally at 10. The process 10 is preferably implemented as a software subroutine operating on the engine control module (ECM) of the protected engine. The process 10 begins at decision block 12 which determines if the current engine state is equal to the constant ENGINE_RUN_STATE in order to determine whether the engine is currently in the run state. If it is not, then there is no need to check for engine hot shutdowns and the subroutine is exited. If the engine is currently in the run state, however, the process continues at block 14 in which a WEIGHTED_LOAD_FACTOR of the engine is calculated by applying a digital filter to the current instantaneous engine load factor data represented by INST_LOAD FACTOR. The current load factor data INST_LOAD_FACTOR may be calculated in any manner which is believed to be indicative of the current loading of the engine. For example, the current load factor may be determined from various engine sensor data indicative of engine speed, engine fueling conditions, exhaust manifold temperature, oil temperature, and time. The WEIGHTED_LOAD FACTOR is calculated from this current load factor data by applying the the current load factor data to a filter, such as a first order digital filter.

Once the WEIGHTED_LOAD_FACTOR has been calculated at block 14, the process moves to decision block 16 which determines if the WEIGHTED_LOAD FACTOR is greater than or equal to a predetermined threshold variable LOAD FACTOR_SHUTDOWN_THRESHOLD. The value of the predetermined variable LOAD_FACTOR_SHUTDOWN_THRESHOLD is predetermined in accordance with the performance capabilities of the particular engine which is being monitored by the process 10. If decision block 16 determines that the WEIGHTED_LOAD_FACTOR is not greater than or equal to the predetermined threshold, then the subroutine is exited with no further action.

If, on the other hand, decision block 16 determines that the LOAD_FACTOR SHUTDOWN_THRESHOLD has been exceeded, then it is necessary to determine whether the engine shutdown request resulted from a keyswitch operation by the vehicle operator or by a shutdown request from another portion of the ECM control software. Decision block 18 therefore checks to determine if the shutdown request was the result of a driver keyswitch operation. If so, then the fault indicator HOT_SHUTDOWN_KEYOFF_ERROR is set equal to true in order to indicate that the driver shut down the engine without allowing a proper cool off period. This occurs at block 20. The process 10 may optionally record any predetermined desired engine parameters at this time so that it may later be determined what condition the engine was in when the improper keyoff request was made. After execution of block 20, the process 10 is exited.

If decision block 18 determines that the engine shutdown is not the result of a driver-initiated keyswitch operation, then the process continues to decision block 22 which determines if the engine shutdown was requested by another software feature of the ECM. If not, the process 10 is exited. If so, the process continues to block 24 which sets the fault indicator HOT_SHUTDOWN FEATURE_ERROR equal to true in order to record the fact that the hot engine shutdown was the result of an ECM software feature request. As was the case with the block 20, the block 24 may also optionally record any predetermined engine condition sensor data for future reference. The process 10 is then exited.

As an alternative to the calculation of WEIGHTED_LOAD_FACTOR in the process 10 of FIG. 1, an alternative method is to gather instantaneous load factor data at regular intervals, preferably at a frequency of 1 Hz. This data would be automatically recorded by the ECM for occasional use by the engine hot shutdown monitor. With reference to the graph of FIG. 2, the engine hot shutdown monitor may use this "counted" data for a number of increments prior to the shutdown request. For example, once a shutdown request has been determined, the ECM may retrieve the previous 50 data points of instantaneous load factor versus time delay from shutdown and compare them to a predetermined limit graph, such as that shown in FIG. 2. The graph of FIG. 2 imposes varying required cooldown time period thresholds depending upon the magnitude of the instantaneous load factor. It is therefore possible for the ECM to compare the historical instantaneous load factor data to the predetermined time period threshold requirements illustrated in FIG. 2 in order to determine whether the shutdown request should be logged as a fault or not.

Figure 2:
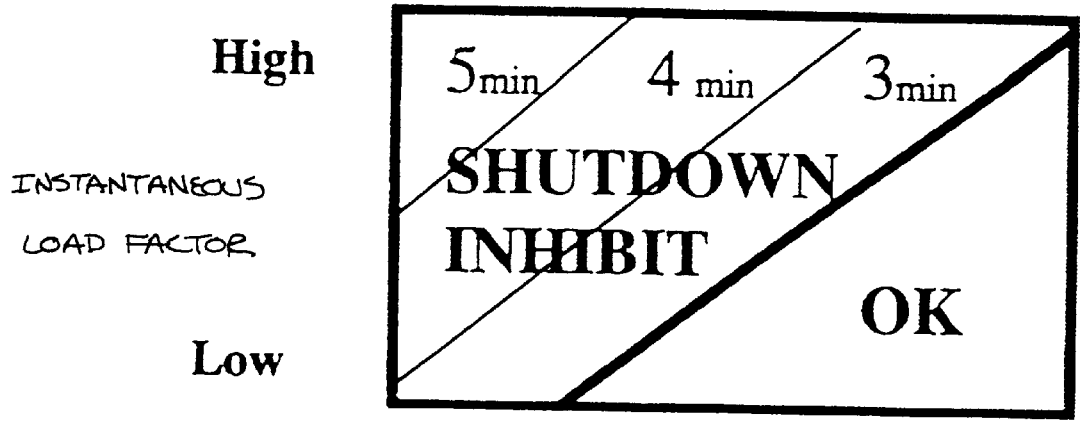
FIG. 2 is a graph of instantaneous load factor versus time, illustrating a typical shutdown threshold scheme of the present invention.
Figure 3:
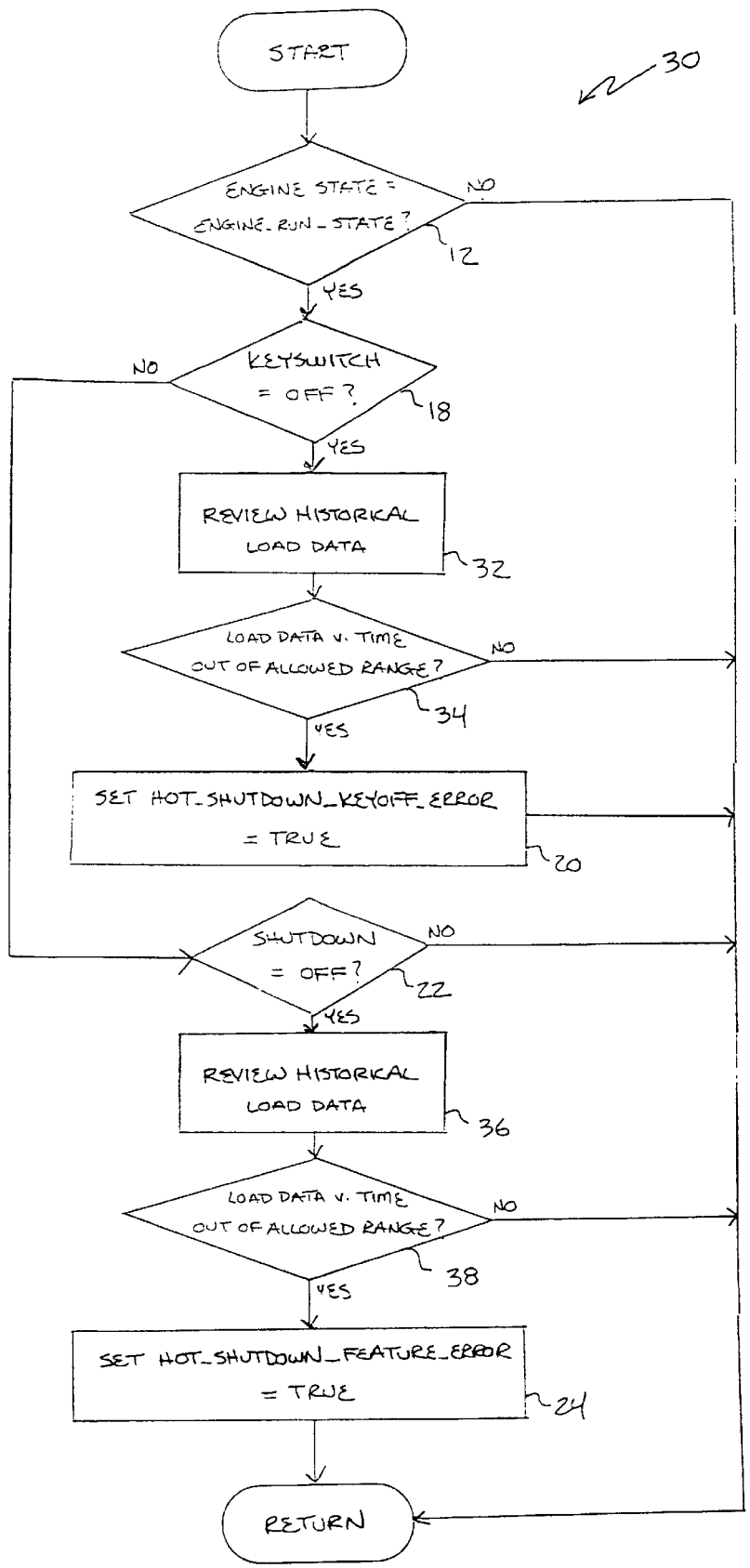
FIG. 3 is a schematic process diagram of a second embodiment engine hot shutdown monitor of the present invention.

A schematic process diagram of an engine hot shutdown monitor incorporating the method of FIG. 2 is illustrated in FIG. 3, and indicated generally at 30. The process 30 is similar to the process 10 of FIG. 1, with the exception that the determination of WEIGHTED_LOAD_FACTOR at step 14 and the determination of whether this WEIGHTED_LOAD_FACTOR is greater than the predetermined threshold at step 16 have been replaced with a new test which implements the limits of FIG. 2.

The process 30 therefore begins at step 12 which determines if the engine is currently in a running state, and proceeds to step 18 which checks for a driver keyoff command. If the driver has requested an engine shutdown, then the process 30 reviews the historical engine loading data which has been periodically stored into memory by the ECM. This review is performed at step 32. Decision block 34 next determines whether any of the historical load data is out of a predetermined allowed range by comparing this load data with predetermined acceptable limits analogous to those illustrated in FIG. 2. If none of the load data is out of range, the process 30 is exited. If, however, step 34 determines that some of the historical load data indicates a hot engine shutdown, then the process continues at step 20 which sets the fault indicator HOT_SHUTDOWN_KEYOFF_ERROR equal to true. The process 30 is then exited.

If decision block 18 had determined that the driver had not requested an engine shutdown, the process jumps to step 22 which determines if another feature of the ECM has requested an engine shutdown. If not, the process 30 is exited, otherwise the process proceeds to steps 36 and 38, which are analogous to steps 32 and 34. If decision block 38 determines that a hot engine shutdown has been requested by an ECM feature, then the fault indicator HOT SHUTDOWN_FEATURE_ERROR is set equal to true at step 24 and the process 30 is exited.

It will be appreciated by those having ordinary skill in the art that either of the above-described embodiments will allow for monitoring of engine operation and recording of engine hot shutdowns. This information can be very useful to service personnel in diagnosing engine malfunctions, predicting future malfunctions, and in demonstrating to the vehicle owner that the vehicle's engine is being abused. The result should be greater operator awareness and less frequent hot engine shutdowns in the future.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for monitoring and recording hot shutdowns of an internal combustion engine, comprising the steps of:
   a) determining a load factor of the engine;
   b) determining if said load factor exceeds a predetermined threshold; and
   c) recording a hot shutdown error if said load factor exceeds the predetermined threshold.

2. The method of claim 1, wherein step (a) comprises determining an instantaneous load factor of the engine.

3. The method of claim 1, wherein step (a) comprises:
   a.1) determining an instantaneous load factor of the engine at successive instants of time; and
   a.2) determining said load factor of the engine based upon a plurality of said instantaneous load factors.

4. The method of claim 3 wherein step (a.1) further comprises determining said instantaneous load factor at periodic instants of time.

5. The method of claim 3, wherein step (a.2) further comprises determining said load factor by filtering a plurality of said instantaneous load factors.

6. The method of claim 5, wherein said filtering comprises first order digital filtering.

7. The method of claim 3, wherein the instantaneous load factor is calculated from a speed of the engine, a fueling condition of the engine, an exhaust manifold temperature of the engine, and an oil temperature of the engine.

8. The method of claim 1, wherein step (c) further comprises:
   c.1) determining if an operator of the engine has commanded a shutdown of the engine; and
   c.2) recording a hot shutdown keyoff error if said load factor exceeded the predetermined threshold and the operator commanded a shutdown of the engine.

9. The method of claim 1, wherein step (c) further comprises:
   c.1) determining if an engine control module has commanded a shutdown of the engine; and
   c.2) recording a hot shutdown feature error if said load factor exceeded the predetermined threshold and the engine control module commanded a shutdown of the engine.

10. A method for monitoring and recording hot shutdowns of an internal combustion engine, comprising the steps of:
    a) determining a load factor of the engine at successive instants of time;
    b) recording each said load factor;
    c) determining if the engine has been commanded to shut down;
    d) if the engine has been commanded to shut down, determining a respective time delay since each said recorded load factor;
    e) for each said recorded load factor, retrieving a predetermined time period threshold value chosen particularly for each value of recorded load factor;
    f) determining if each said time delay is greater than each said respective predetermined time period threshold; and
    g) recording a hot shutdown error if any said time delay is not greater than said respective predetermined time period threshold.

11. The method of claim 10, wherein step (a) comprises determining an instantaneous load factor of the engine.

12. The method of claim 10, wherein step (a) comprises:
    a.1) determining an instantaneous load factor of the engine at successive instants of time; and
    a.2) determning said load factor of the engine based upon a plurality of said instantaneous load factors.

13. The method of claim 12, wherein step (a.1) further comprises determining said instantaneous load factor at periodic instants of time.

14. The method of claim 12, wherein step (a.2) further comprises determining said load factor by filtering a plurality of said instantaneous load factors.

15. The method of claim 14, wherein said filtering comprises first order digital filtering.

16. The method of claim 12, wherein the instantaneous load factor is calculated from a speed of the engine, a fueling condition of the engine, an exhaust manifold temperature of the engine, and an oil temperature of the engine.

17. A method for monitoring and recording hot shutdowns of an internal combustion engine, comprising the steps of:
    a) determining an instantaneous load factor of the engine at successive instants of time;
    b) determining a weighted load factor based upon a plurality of said instantaneous load factors;
    c) determining if said weighted load factor exceeds a predetermined threshold;
    d) determining if an operator of the engine has commanded a shutdown of the engine;

e) recording a hot shutdown keyoff error if said weighted load factor exceeded said predetermined threshold and the operator commanded a shutdown of the engine;

f) determining if an engine control module has commanded a shutdown of the engine; and g) recording a hot shutdown feature error if said weighted load factor exceeded said predetermined threshold and the engine control module commanded a shutdown of the engine.

18. The method of claim 17, wherein step (a) further comprises determining said instantaneous load factor at periodic instants of time.

19. The method of claim 17, wherein step (b) further comprises determining said weighted load factor by filtering a plurality of said instantaneous load factors.

20. The method of claim 19, wherein said filtering comprises first order digital filtering.

21. The method of claim 17, wherein the instantaneous load factor is calculated from a speed of the engine, a fueling condition of the engine, an exhaust manifold temperature of the engine, and an oil temperature of the engine.

* * * * *

UNITED STATES PATENT AND TRADEMARK OFFICE
CERTIFICATE OF CORRECTION

PATENT NO. : 6,055,470
DATED : April 25, 2000
INVENTOR(S) : Londot et al.

Page 1 of 3

It is certified that error appears in the above-identified patent and that said Letters Patent is hereby corrected as shown below:

Title page,
Following "Assignee", please change "Cummine" to -- Cummins --.

Abstract,
Line 12, please insert -- ) -- following "keyoff".

Column 6,
Line 41, please change "determning" to -- determining --.

Please replace FIG. 1 with the following formal version:

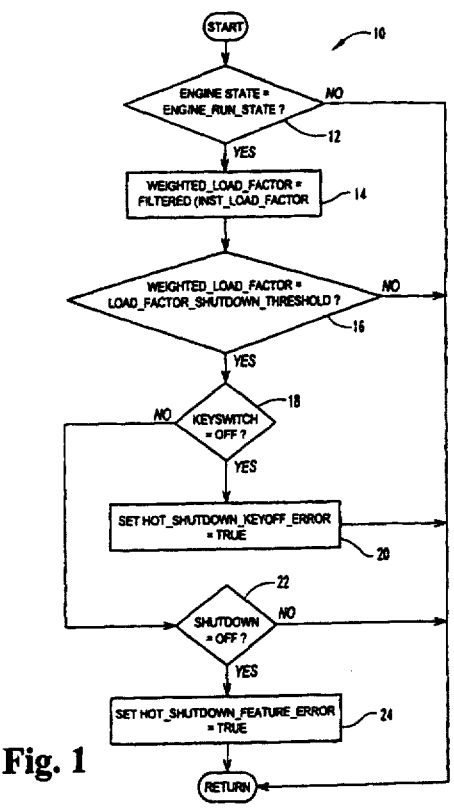

Fig. 1

UNITED STATES PATENT AND TRADEMARK OFFICE
CERTIFICATE OF CORRECTION

PATENT NO. : 6,055,470
DATED : April 25, 2000
INVENTOR(S) : Londot et al.

It is certified that error appears in the above-identified patent and that said Letters Patent is hereby corrected as shown below:

Please replace FIG. 2 with the following formal version:

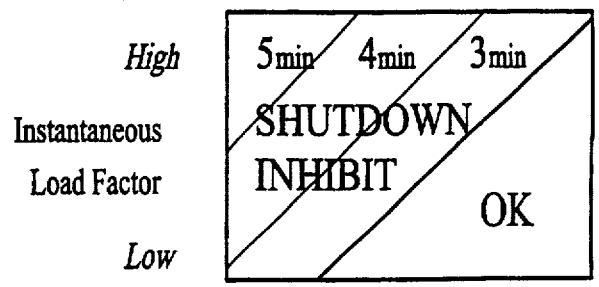

Time (min)
(Prior to Shutdown)

Fig. 2

UNITED STATES PATENT AND TRADEMARK OFFICE
CERTIFICATE OF CORRECTION

PATENT NO.   : 6,055,470
DATED        : April 25, 2000
INVENTOR(S)  : Londot et al.

Page 3 of 3

It is certified that error appears in the above-identified patent and that said Letters Patent is hereby corrected as shown below:

Please replace FIG. 3 with the following formal version:

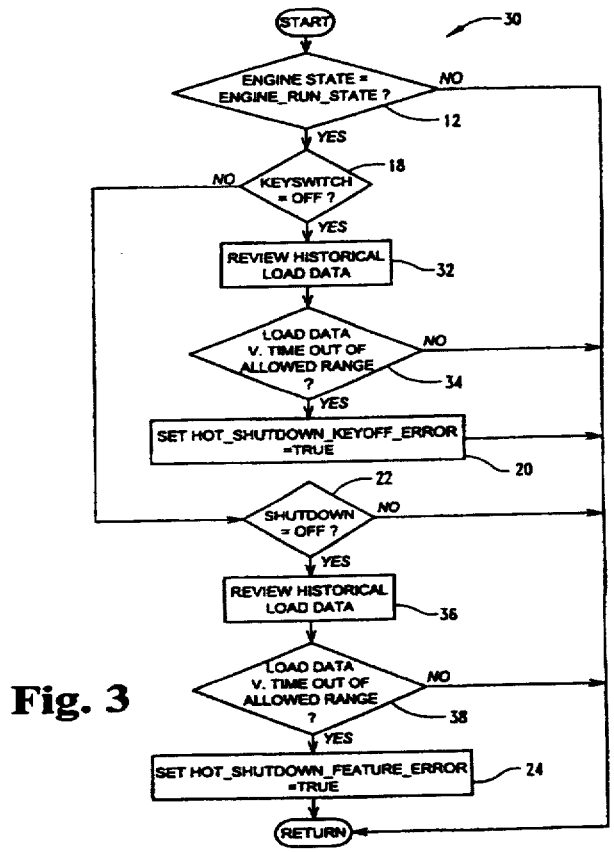

Fig. 3

Signed and Sealed this

Thirteenth Day of November, 2001

Attest:

*Attesting Officer*

NICHOLAS P. GODICI
*Acting Director of the United States Patent and Trademark Office*